3,089,808
ACARICIDAL DIAMIDO PHOSPHATE PHENOL COMPLEX

Jacques Meltzer and Bernardus Gerhardus van den Bos, both of Weesp, and Cornelis Johannes Schoot, Eindhoven, Netherlands, assignors to North American Philips Company, Inc., New York, N.Y., a corporation of Delaware
No Drawing. Filed July 22, 1960, Ser. No. 44,551
Claims priority, application Netherlands Aug. 6, 1959
5 Claims. (Cl. 167—30)

This invention relates to novel acaricides particularly useful in combatting red spider mites.

According to the invention a preparation for combatting red spider mites contains as the active substance a compound of the general Formula I

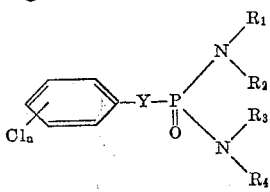

where Y represents an oxygen or sulphur atom and $R_1$, $R_2$, $R_3$ and $R_4$ each represent an alkyl group containing from 1 to 3 carbon atoms and $n=2, 3, 4$ or 5, or a molecular compound of a compound of Formula I and a compound of the general Formula II

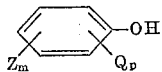

where Z represents chlorine and Q a nitro group and $m=0$ to 5 and $p=0$, 1 or 2, on the understanding that $m+p=$ at the most 5.

A particularly suitable active substance is a compound of the Formula I, where $R_1$ to $R_4$ each represent a methyl group. This applies particularly to bis(N,N-dimethylamido) pentachlorophenylphosphate, -thiolophosphate and bis(N,N - dimethylamido) - 2,4,5 - trichlorophenylthiolophosphate; in particular the first mentioned compound has a very intense acaricidal activity.

Especially important molecular compounds are the compounds containing phenol, nitrophenols, di-, tri-, tetra- and pentachloro-phenols and especially the compounds formed by the combination of phenol, 3-nitrophenol, 2,6-dichlorophenol or 2,4,6-trichlorophenol and bis(N,N-dimethylamido)-pentachlorophenylphosphate in equimolar amounts.

The high activity of the compounds in accordance with the invention was determined inter alia by experiments with bean red spider mites (*Tetranychus urticae* Koch).

The acaricidal compositions of the invention can be produced according to known methods. Thus, the compounds may be mixed, for example while grinding with a powdered inert carrier, such as chalk, dolomite, attapulgite, china clay or pipe clay, or be dissolved or dispersed in an inert solvent, such as aromatic and aliphatic hydrocarbons, for example toluene, xylene and petroleum ether, aliphatic and aromatic ketones, for example acetone, methyl-ethylketone and cyclohexanone, or mixtures thereof, if required with the addition of surface-active substances, dispersion agents and/or adhesives.

It may be of advantage to produce a pesticide by combining a compound according to the invention with another acaricide or an insecticide, etc. for example with the acaricide 2,4,5,4'-tetrachlorodiphenylsulfone.

The compounds in accordance with the invention of Formula I may be prepared by the known methods for producing similar compounds or methods analogous thereof or by the methods described in copending U.S. patent application Serial Number 793,294.

A suitable method of production for example is that in which a compound of the general formula

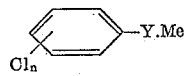

is reacted with a compound of the general formula

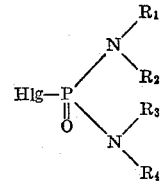

in which formulae Y, $R_1$, $R_2$, $R_3$ and $R_4$ and $n$ have the above-mentioned meaning, Me represents an alkali metal, for example sodium, and Hlg represents a halogen atom and preferably chlorine. Preferably the reaction is carried out in a solvent, for example in benzene, acetonitrile or acetone.

The molecular compounds in accordance with the invention are new. Their production can be performed simply, for example by melting the two constituents together and cooling the melt. Another suitable method comprises dissolving the two compounds together in an inert solvent, evaporating the solvent and cooling the residue. For purification, the molecular compounds can be crystallized, for example, from aromatic or aliphatic hydrocarbons or mixtures thereof.

It has been found inter alia from melting diagrams that the molecular compounds generally consist of equimolar amounts of the constituents. However, in a few cases, the molecular compound is built up from 2 molecules of a compound of Formula II and one molecule of a compound of Formula III.

The invention will now be described in greater detail with reference to the following examples:

Example I

The molecular compound of bis(N,N-dimethylamido) pentachlorophenylphosphate and phenol was produced by dissolving 40 g. of the former compound and 9.4 g. of phenol in 250 ccs. of benzene while heating, evaporating the benzene in vacuo and crystallizing the obtained residue from a mixture of petroleum ether (boiling range 60–80° C.) and benzene (in a ratio of 1:1). Melting point 101–102° C.

Similarly, molecular compounds were produced from bis(N,N - dimethylamido) pentachlorophenylphosphate and 4-chlorophenol (88–89° C.), 2,6-dichlorophenol (88–89° C.), 2,4,6-trichlorophenol (122–124° C.), pentachlorophenol (137–138° C.) and 3-nitrophenol (92–93° C.) respectively, from bis(N,N-dimethylamido)-2, 4,5-trichlorophenylphosphate and 2,4,5-trichlorophenol (65–66° C.) or pentachlorophenol (65–66° C.) respectively, and from bis(N,N-dimethylamido) pentachlorophenylthiolophosphate and pentachlorophenol (133–134° C.) and 2,6-dichlorophenol (102–103° C.) respectively. In the last mentioned case, the molecular compound consisted of 2 molecules of the thiolophosphate and 1 molecule of the phenol; in the remaining cases, the molecular compounds were built up equimolar amounts of the constituents. The melting points are given in brackets after the various molecular compounds.

*Example II*

A dust was produced by grinding 5 parts by weight of bis(N,N - dimethylamido) pentachlorophenylphosphate, 10 parts by weight of kieselguhr and 85 parts by weight of dolomite together to a mean particle size of about 10 microns.

*Example III*

A wettable powder was produced by mixing 20 parts by weight of a molecular compound of bis(N,N-dimethylamido) pentachlorophenylphosphate and 2,6-dichlorophenol, 73 parts by weight of dolomite, 2 parts by weight of oleylamidomethyltaurate and 5 parts by weight of sodium ligninsulphonate and then grinding the mixture to a mean particle size of about 10 microns.

*Example IV*

In order to produce a miscible oil, 10 parts by weight of bis(N,N-dimethylamido) - 2,4,5 - trichlorophenylthiolophosphate was dissolved in a mixture of 12 parts by weight of dioxane, 6 parts by weight of poly-oxyethylenesorbitane fatty acid ester and 72 parts by weight of xylene. This oil produced stable emulsions in water.

While we have described our invention in connection with specific embodiments and applications, other modifications thereof will be readily apparent to those skilled in this art without departing from the spirit and scope of the invention as defined in the appended claims.

What we claim is:

1. An acaricidal composition particularly adapted for the destruction of red spider mites containing an acaricidally effective amount of at least one molecular complex of a diamido phosphate having the general structural formula:

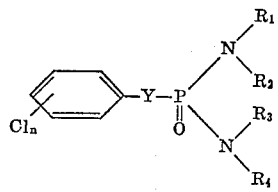

wherein Y represents a member of the group consisting of oxygen and sulfur atoms, $R_1$, $R_2$, $R_3$ and $R_4$ each represent alkyl groups containing from 1 to 3 carbon atoms and $n$ represents an integer from 2 to 5 and a phenol, said molecular complex having the general structural formula:

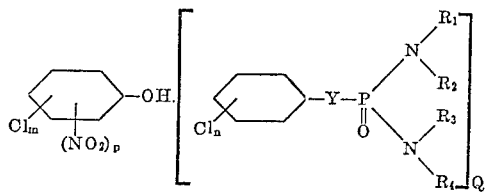

wherein $m$ represents an integer from 0 to 5, $p$ represents an integer from 0 to 2 and $m+p$ together have values from 0 to 5 and Q is a whole number from 1 to 2 and an inert carrier therefor.

2. The composition of claim 1 wherein the molecular complex consists of equal molecular portions of bis(N,N-dimethylamido) pentachlorophenylphosphate and a compound selected from the group consisting of phenol, 2,6-dichlorophenol, 2,4,6-trichlorophenol and 3-nitrophenol.

3. Molecular complexes of the general formula

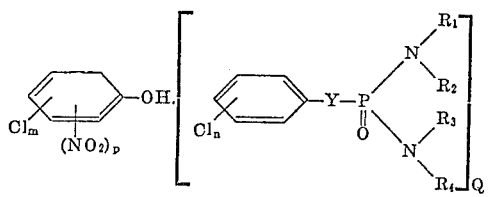

wherein Y represents a member of the group consisting of an oxygen and sulphur atoms and $R_1$, $R_2$, $R_3$ and $R_4$ each represent an alkyl group containing from 1 to 3 carbon atoms and $n$ represents an integer from 2 to 5, $m$ represent an integer from 0 to 5, $p$ represents an integer from 0 to 2, $m+p=$at the most 5 and Q is a whole number from 1 to 2.

4. Pentachlorophenylphosphate derivatives selected from the group consisting of the molecular complexes consisting of equimolar amounts of bis(N,N-dimethylamido) pentachlorophenyl phosphate and a compound selected from the group consisting of phenol, 2,6-dichlorophenol, 2,4,6-trichlorophenol and 3-nitrophenol.

5. A method of destroying red spide mites comprising contacting said mites with the composition of claim 1.

References Cited in the file of this patent

UNITED STATES PATENTS

| | | |
|---|---|---|
| 2,552,538 | Drake et al. | May 15, 1951 |
| 2,875,233 | Blair et al. | Feb. 24, 1959 |
| 2,879,286 | Tolkmith et al. | Mar. 24, 1959 |
| 3,038,924 | Schoot et al. | June 12, 1962 |

FOREIGN PATENTS

| | | |
|---|---|---|
| 605,268 | Great Britain | July 20, 1948 |
| 5,595 | Japan | July 26, 1957 |